United States Patent [19]

Jones

[11] Patent Number: 4,997,563

[45] Date of Patent: Mar. 5, 1991

[54] WATER TREATMENT CARTRIDGE WITH FOAM AND GRANULAR MATERIAL

[76] Inventor: Wayne Jones, 824 Miraflores Ave., San Pedro, Calif. 90731

[21] Appl. No.: 408,404

[22] Filed: Sep. 15, 1989

Related U.S. Application Data

[63] Continuation of Ser. No. 129,741, Dec. 7, 1987, abandoned.

[51] Int. Cl.⁵ .............................................. B01D 27/02
[52] U.S. Cl. .................................. 210/264; 210/282; 210/287; 210/416.3; 210/496; 210/510.1
[58] Field of Search .................. 210/190, 195.1, 416.3, 210/437, 496, 501, 502.1, 510.1, 264, 282, 287, 506

[56] References Cited

U.S. PATENT DOCUMENTS

| | | | |
|---|---|---|---|
| 3,482,697 | 12/1969 | Tremont et al. | 210/190 |
| 3,831,754 | 8/1974 | Heskett | 210/282 |
| 4,228,000 | 10/1980 | Haeschler | 210/190 |
| 4,504,391 | 3/1985 | Weens, Sr. | 210/307 |
| 4,594,361 | 6/1986 | Beaunan et al. | 210/754 |
| 4,675,111 | 6/1987 | Newton et al. | 210/416.1 |

*Primary Examiner*—Richard V. Fisher
*Assistant Examiner*—Wanda L. Millard
*Attorney, Agent, or Firm*—James E. Hawes

[57] ABSTRACT

A water treatment device is described which incorporates an easily changed cartridge containing an open-cell foam having a water treatment material contained therein, such as granules of a halogen compound. The device includes an adjustable orifice valve member which may be selectively positioned to control the water flowing through the cartridge. Thus, the device may be included in a water treatment system to treat either water flowing a source to a storage tank, or water being recirculated back into the storage tank.

3 Claims, 2 Drawing Sheets

WATER TREATMENT CARTRIDGE WITH FOAM AND GRANULAR MATERIAL

This is a continuation of co-pending application Ser. No. 129,741, filed on Dec. 7, 1987, now abandoned.

INTRODUCTION

This invention concerns a water treatment device, and a system incorporating that device, the device providing a simple yet effective way to impart any of a variety of treatments to water flowing through it.

In the preferred environment, the device of the present invention is used to treat water, preferably to render it potable. However, as will be apparent to those skilled in this field the device may be adapted to treat any of a variety of liquids.

Water is the basis for virtually all known biological activity. A reliable source of potable water is essential to life and health. Yet, since water can sustain a great many organisms, and since water is an excellent solvent, its potability and quality must be regularly monitored.

Potable water must be free of disease causing organisms, or pathogens, and should also have no taste, odor or cloudiness. Pathogens are commonly eliminated from potable water by use of a strong oxidizing disinfectant such as any of the various halogens—particularly chlorine, bromine and iodine. Such halogens exhibit good biocidal activity even in the presence of dissolved nitrogen and nitrogen based compounds such as ammonia, and also are good viricides. Halogens, however, require special handling, for among other things they are corrosive and their fumes can be toxic.

In many potable water systems, particularly marine offshore and mobile water systems, water is supplied from a source, often a distillation system, to a storage tank where it is held until withdrawn for use. Some water treatment systems are designed to be incorporated in the line feeding the storage tank, and to treat the water flowing into the tank. Over time, the quality of water in the tank will change. For that reason, it is necessary to occasionally treat the water in the tank, which some systems achieve by recirculating the tank water through a water treatment device.

Any water treatment device must prove effective; it must eliminate any pathogens in the water, and should do so without requiring constant attention and service. In addition, it should be easily maintained and its pathogenic activity restored by even inexperienced personnel.

One object of the present invention is to provide a water treatment device that is simple in construction, yet which reliably treats water flowing through it to ensure potability. The device is designed, and incorporates an appropriate structure, to permit it to be used in both the supply line and the recirculating line of a potable water tank. Using an easily replaced cartridge, the device may be employed to impart any of a variety of treatments to the water flowing through it, yet it may be maintained and serviced by even inexperienced personnel These and other objects of the present invention will appear from the following description of a preferred embodiment.

BRIEF SUMMARY OF THE INVENTION

The water treatment device of the present invention is intended to receive and treat a flowing stream of potable water. It includes a container having an inlet and an outlet, a cartridge received within the container, and structure to direct a flow of water into the container, through the cartridge and then to the outlet of the container. The cartridge incorporates an open-cell foam matrix and any of various materials for treating water flowing through the cartridge. In a preferred embodiment, this material is a bromide, such as polybromide resin or granules of bromobutyrite acid. Preferably the container includes a channel between the inlet to the cartridge and outlet from the cartridge to shunt water around the cartridge, and an orifice to produce a sufficient pressure differential for the flow desired through the cartridge. By changing the size of the orifice, the device may be adapted to any of various water systems, and included for example either in the line supplying water to a storage tank or in a line recirculating water through the storage tank.

BRIEF DESCRIPTION OF THE DRAWINGS

The invention will be further described in connection with the accompanying drawings, in which.

DETAILED DESCRIPTION

While in its broadest sense the present invention provides a simple yet effective device for treating any of a variety of liquids, in a preferred application it is employed in a potable water system. For that reason, the following detailed description is presented in that context.

Figure 1:
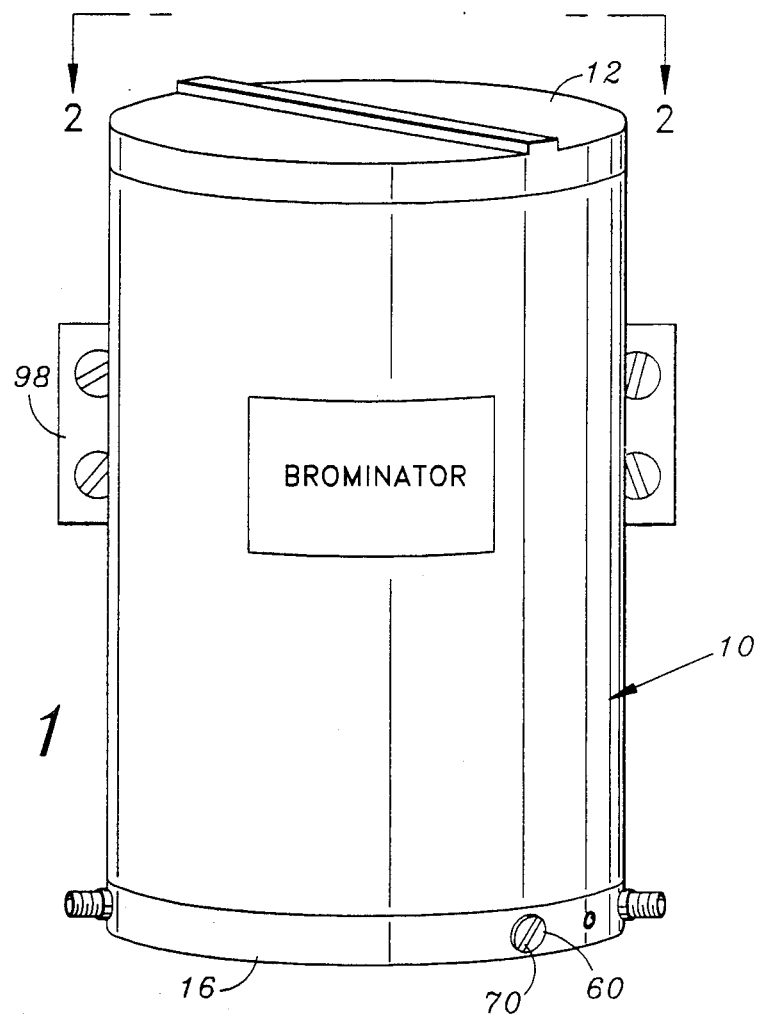
FIG. 1 is a perspective view of a preferred construction of the water treatment device of the present invention.
Figure 2:
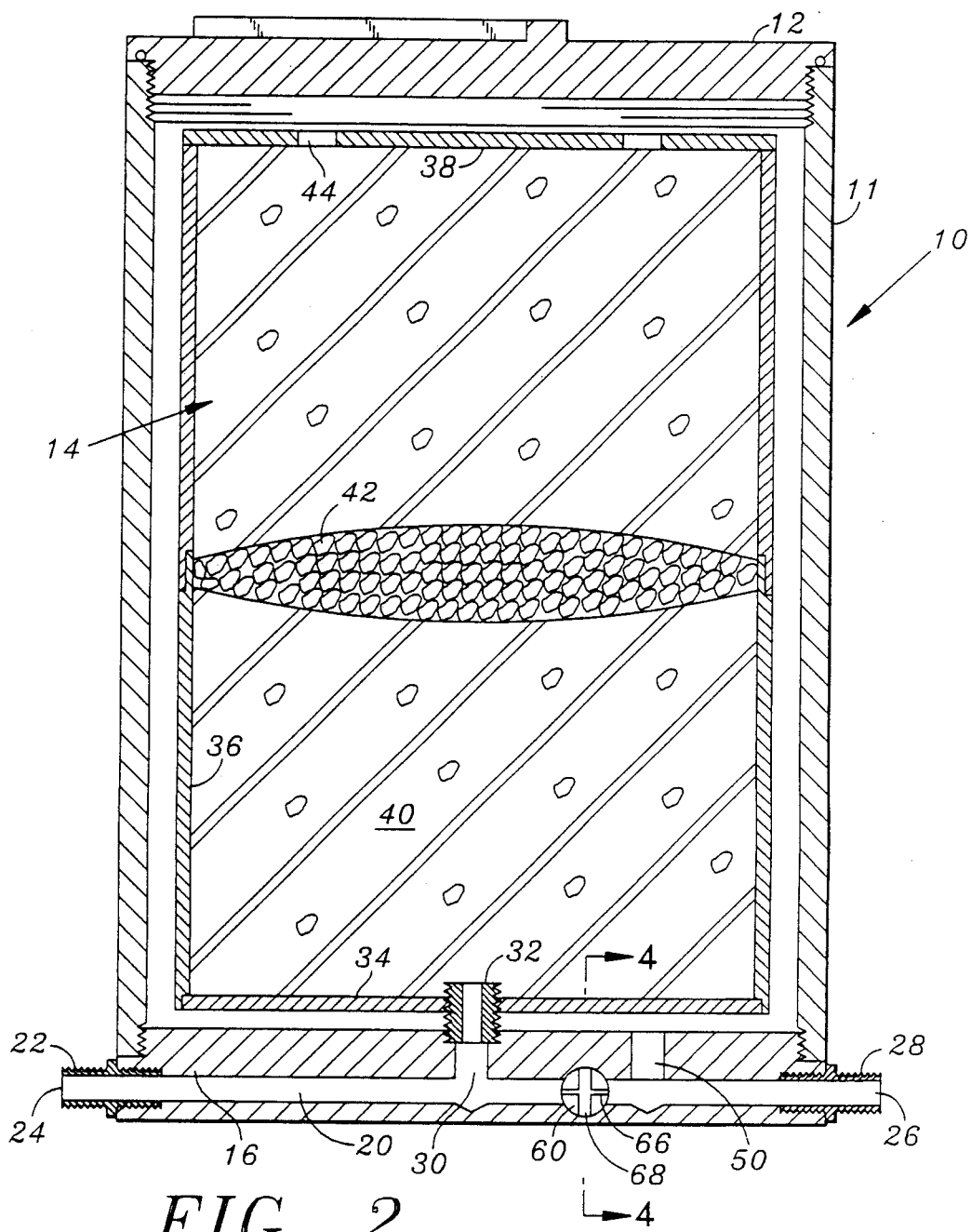
FIG. 2 is a cross-section of the water treatment device taken on line 2—2 of FIG. 1.

As shown in perspective in FIG. 1, and in cross-section in FIG. 2, the preferred construction of the present water treatment device 10 consists of a cup or container 11 closed by a threaded cap or lid 12, the container receiving a cartridge 14 within its hollow interior. The base plate 16 of the container has within it a channel 20 extending from an inlet orifice 22 defined by nipple 24 to an outlet orifice 26 defined by nipple 28. At the center of base plate 16 and in fluid communication with channel 20 is an upwardly extending channel 30. A nipple 32 that is received in and fixed to a central orifice in the base 34 of cartridge 14 is threaded into the base plate at the upper end of channel 30.

In its preferred construction, cartridge 14 is cylindrical, having a PVC tubular casing or wall 36 to which base 34 is fixed at one end, 34, and to which a cap 38 is fixed at the other end. Within the cartridge 14 is an open-cell foam matrix 40 which captures and holds, at its central portion, a granular water treatment material 42 such as a polybromide resin or granular bromobutyric acid. Cap 38 includes a plurality of openings 44 preferably large enough to permit the person changing the cartridge to place his fingertips in opposed openings 44 and easily screw, or unscrew the cartridge from base plate 16. Water flowing into inlet orifice 22 of container 10 will flow down channel 20 then upwardly through channel 30 and nipple 32 into the foam matrix 40 of cartridge 14. After passing through the foam matrix and water treatment material 42, the water then passes out openings 44 to spill over the outside of cartridge 14. Base 16 also includes a channel 50 extending between the interior of container 10 and channel 20 adjacent outlet orifice 26. Thus, water flowing through cartridge 14 and spilling over its top will flow out this channel 50 to outlet orifice 26.

Figure 3:
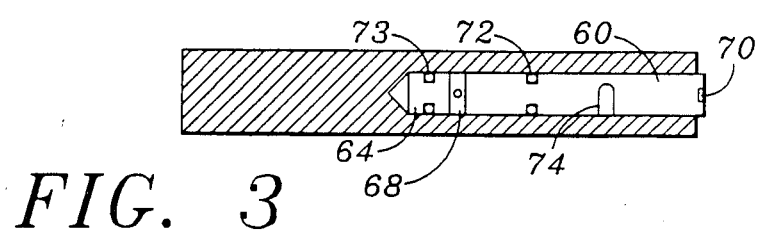
FIG. 3 is a cross-sectional view of the orifice member and associated channel of the water treatment device taken on lines 3—3 of FIG. 2.

Preferably, a valve member 60 is received in a blind opening 64 (see FIG. 3) in the side of base plate 16, which blind opening extends through channel 20. Preferably valve member 60 includes two orifice channels 66 and 68 (see FIG. 2), one perpendicular to the other, and both being positioned along valve member 60 to be alignable with channel 20. Valve member 60 may be rotated, using slot 70 in its outer, exposed end, to orient either orifice 66 or orifice 68 in line with channel 20. Because channel 20 extends from inlet 22 to outlet 26, orifices 66 and 68 will each induce a predetermined restriction in channel 20 to result in a predetermined pressure differential between channel 30 and channel 50, thereby determining a flow through cartridge 14. As will be discussed subsequently, these orifices may be sized to result in flow rates through cartridge 14 that are appropriate for either an in-line or recirculating water treatment system. 0-ring 72 prevents water from leaking out between valve member 60 and opening 64, and 0-ring 73 assists in orienting and holding the valve member in opening 64. A pie shaped notch or slot 74 in valve member 60 cooperates with a stop 75 threaded into plate 16 to allow the valve to be rotated only 90°, moving between the first and second orifice positions.

Cartridge 14 may incorporate any of a variety of water treatment materials. Because it consists predominantly of an open cell foam, it will inherently filter the water flowing through it. By adjusting the cell size of this foam in a manner well known to those experienced in making such foam, the amount or extent of filtration can be adjusted. Preferably the cartridge 14 incorporates a material that is pathogenic to micro-organisms, this material in a preferred embodiment being a halogen such as a polybromide resin or granular bromobutyric acid available from Great Lakes Chemical Corporation of West Lafayette, Ind. (their product code 030). In addition, the foam may incorporate any of a variety of other materials to treat water flowing through cartridge 14, materials such as granulated charcoal to remove tastes and odors, a calcium or magnesium salt to remove dissolved iron and eliminate "hardness," and an alkaline compound such as soda ash to adjust pH and neutralize dissolved carbonates. Of course, various cartridges can be provided for different applications, different cartridges incorporating various combinations of such materials as desired or required.

The cartridge may be easily fabricated. For example, a three inch diameter section of schedule 40 PVC pipe may be closed at one end by a piece of masking tape, then a polyurethane two-component foam such as offered by Polymer Development Laboratories Inc. of Orange, Calif. (their product no. PDL2100-3.5NFR) mixed three parts of the B component (marked "Polymethaw Systems-B-Polyot") to one part of the A component (market "Polymethaw System Isocynate") and poured into the pipe section to fill the length of PVC pipe. This material will foam and set sufficiently in about 20 minutes. The pipe is then cut into sections to expose the interior foam, and adjacent sections machined as shown in FIG. 2 to interact with one another, and to receive end caps 34 and 44. Then the sections are charged with an appropriate treatment material (such as 1¼ ounces of the previously mentioned bromobutyric acid granules, and the PVC edges solvent welded together to complete the cartridge. Of course, a variety of other techniques for fabricating cartridge 14 to provide an open cell foam matrix incorporating granules of the disinfecting and water treatment agents will be apparent to those skilled in working with foams, and may be employed.

Figure 4:
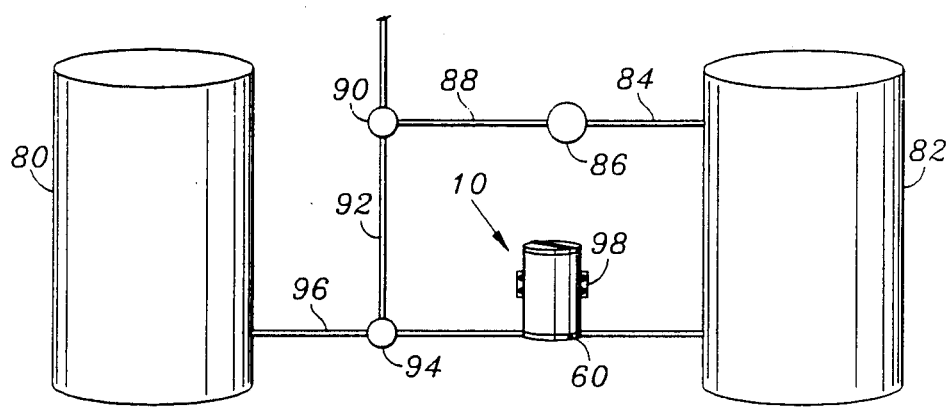
FIG. 4 schematically illustrates a water system incorporating the water treatment device of the present invention.

In a preferred embodiment, the water treatment device may be incorporated in the feed line extending from a distillation system 80 (see FIG. 4) to a water storage tank 82. In addition, this system may include a discharge line 84 connected to pump 86 to supply water to line 88, this line including a valve 90 to direct water to a bypass line 92 that is in turn connected to valve 94. Which valve may be adjusted to either direct water from supply line 96 to the line feeding device 10, or from bypass line 92 to the line feeding device 10. Thus, by adjusting valves 90 and 94 device 10 may be used as an in-line water treatment system in the line extending from distillation system 80 to tank 82, or may be used in a recirculating system to retreat the water contained in tank 82. In addition to adjusting valves 90 and 94, valve member 60 of device 10 also will be adjusted to result in the appropriate back pressure between inlet orifice 22 and outlet orifice 26 of device 10 to achieve a satisfactory flow rate through cartridge 14 and an appropriate level of treatment to the water flowing into tank 82. Typically, mounting tabs 98 are provided on device 10 to permit it to be attached, for example, to a wall or bulkhead.

Periodically an attendant will sample the quality of water stored in tank 82 using any one of a variety of water testing kits. Normally the system will be adjusted such that distillate flows from system 80 through line 96 to tank 82 on demand by the tank as water is withdrawn from it. Periodically though, testing may reveal that the water in tank 82 requires further treatment, in which case valves 90 and 94 will be adjusted, and valve 60 of the water treatment device will also will be adjusted, to recirculate water from tank 82 through bypass line 92. When the water in tank 82 has been treated sufficiently, valves 60, 90 and 94 will be readjusted to their initial positions.

Eventually, the disinfectant or other water treatment material incorporated in cartridge 14 will become exhausted and the water treatment provided by device 10 will not be sufficient. The attendant may easily replace cartridge 14 by first turning off the water supply then unscrewing cap 12 to expose cartridge 14, then unscrewing cartridge 14 with its attached nipple 32 and replacing the cartridge with a fresh one. This new cartridge is placed in container 10 and its threaded nipple 32 threaded into channel 30, after which cap 12 is replaced, this cap being sealed to the top of container 10 by an appropriate "0" ring. The side wall of container 10 may be threaded about base plate 16, as shown, or it may be solvent welded to that base plate if desired.

Since variations in the water treatment device and system will be apparent to those skilled in this art, the invention is not defined by the preferred embodiments shown and described herein, but instead is set forth in the following claims.

I claim:
1. A cartridge for a water treatment system, the cartridge including:
 a tubular casing, an open cell foam material received within and substantially filling the tubular casing,
a granular water treatment material received within said foam material,
a base closing one end of the casing and having at least one opening for receiving water, and
a cap closing the other end of the casing and having at least one opening for discharging water,
in which the casing is formed by two foam-filled portions disposed adjacent to one another at their abutting peripheries, at least some of the said granular water treatment material being received between the foam fillings of said rings.

2. A cartridge as set forth in claim 1 in which one said end closing has multiple openings of the size large enough to receive fingertips of a hand and permit the cartridge to be manipulated.

3. A cartridge as set forth in claim 1 in which said two foam-filled rings are connected to one another at their abutting peripheries.

* * * * *